June 25, 1957 H. L. JEFFRAS, SR 2,796,972
ATTACHMENT LINK FOR CONVEYOR CHAINS
Filed May 10, 1955
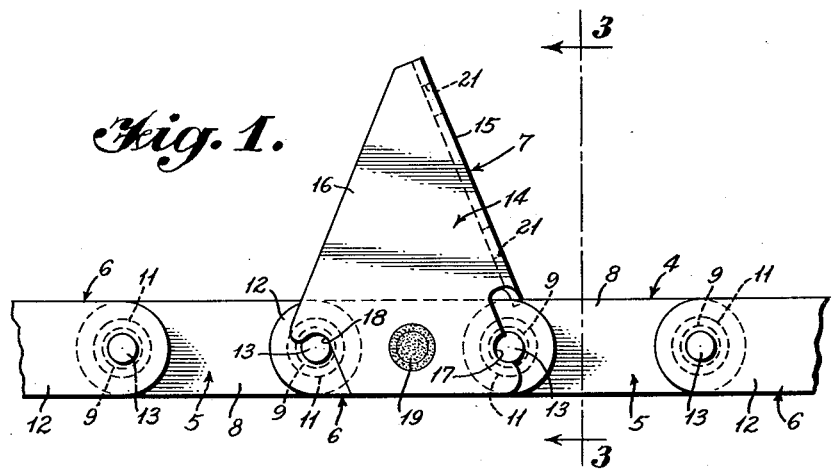
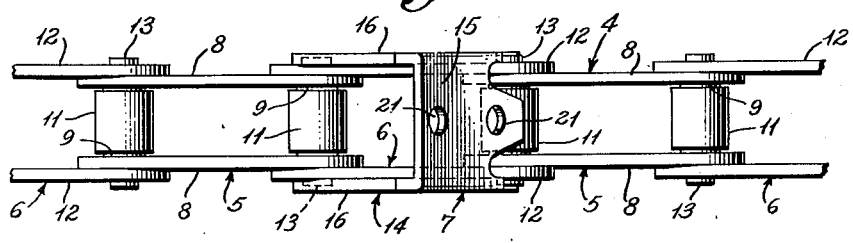
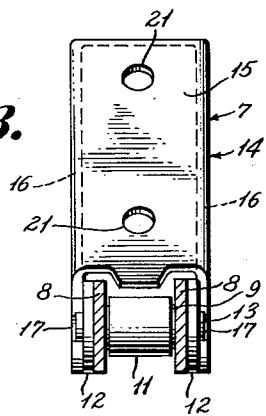

2,796,972

ATTACHMENT LINK FOR CONVEYOR CHAINS

Homer L. Jeffras, Sr., Indianapolis, Ind., assignor to Link-Belt Company, a corporation of Illinois Application May 10, 1955, Serial No. 507,297

5 Claims. (Cl. 198—176)

This invention relates to new and useful improvements in conveyor chains and deals more particularly with attachment links for such chains.

In the past, conveyor chains have been formed with special attachment links arranged at spaced points along the length of the chain, the chain links between adjacent attachment links being of conventional construction. Since the type of attachment links used and the spacing of these links varies widely in different conveyor chain installations, it has not been commercially practical to assemble the attachment links and conventional links of a conveyor chain in the same manner as that employed for a chain formed entirely of conventional links. For example, a roller chain, without attachment links, is ordinarily assembled from the various chain parts by machine into standard chain lengths. Roller type conveyor chain, on the other hand, has been assembled in the past by manually connecting the special attachment links and the interpositioned lengths of conventional roller chain.

It is the primary object of this invention to provide an attachment link for conveyor chains which is formed by an attachment member being mounted on the selected standard link of an assembled chain.

A further important object of the invention is to provide an attachment link for conveyor chains which is so constructed that a standard link of an assembled chain may be converted to an attachment link without disassembling any link of, or in any way breaking, the chain.

Still another important object of the invention is to provide an attachment link for conveyor chains which is formed by mounting an attachment member on a standard chain link in such a manner that the standard link may remain assembled in a length of chain when the attachment member is mounted thereon.

Another object of the invention is to provide an attachment link which includes a standard chain link having chain pins at its opposite end portions and an attachment member which is so formed as to be movable into supported engagement with said pins, the attachment member being thereafter rigidly connected to said link.

Other objects and advantages of the invention will be apparent during the course of the following description.

In the accompanying drawing forming a part of this specification and in which like reference characters are employed to designate like parts throughout the same, Figure 1 is a side elevational view of a section of conveyor chain employing an attachment link embodying the invention, Figure 2 is a top plan view of the chain section illustrated in Fig. 1, and Figure 3 is a vertical sectional view taken on line 3—3 of Fig. 1.

In the drawing, wherein for the purpose of illustration is shown the preferred embodiment of the invention, reference numeral 4 designates in its entirety a conveyor chain formed of alternately arranged standard inside links 5 and outside links 6 and having one of the outside links 6 converted to an attachment link 7. The inside links 5 and outside links 6 are of conventional roller chain construction, each inside link being formed of a pair of side bars 8 joined at their opposite end portions by bushings 9 which are press fitted into laterally aligned holes formed in the end portions of the side bars. Rotatably positioned on each of the bushings 9 between the side bars 8 is a roller 11. Each outside link 6 is formed of a pair of side bars 12 the corresponding end portions of which are connected by chain pins 13 which extend through the bushings 9 of the adjacent inside links 5 and are press fitted into laterally aligned holes formed in the side bars 12.

The standard outside link 6 which is selected to be converted to an attachment link 7 has mounted thereon an attachment member 14 which is stamped from sheet metal and bent along parallel lines at opposite sides thereof to provide a flat body portion 15 and a pair of stiffening webs 16. The flat body portion 15 extends outwardly from the outer or working face of the chain 4 at one end portion of the link 7 and is inclined rearwardly relative to the centerline and the intended direction of movement of the chain. The webs 16 extend rearwardly and inwardly from the side edges of the flat body portion 15 to positions adjacent the laterally outer faces of the side bars 12. That portion of each stiffening web 16 which lies adjacent the laterally outer face of its associated side bar 12 is provided with a notch 17 in its leading edge which opens substantially longitudinally of the link 6 and a notch 18 in its trailing edge which opens in the opposite longitudinal direction and toward the inner face of the chain 4.

The longitudinal spacing between the notches 17 and 18 on each side of the attachment member 14 is such that the notches 17 can be brought into contact with their associated pin 13 and the trailing edge of the attachment member pivoted to bring the notches 18 into contact with their associated pin 13. When the attachment member 14 is assembled on the link 6 as described above, engagement between the notches 18 on the opposite sides of the attachment member and the associated pin 13 will prevent further pivotal movement of the attachment member in a rearward direction relative to the chain 4. While in this position, the mounting portions of the webs 16 adjacent the side bars 12 on opposite sides of the link 6 are welded to the side bars by a single spot weld 19 approximately midway between the pins 13. The attachment member 14 is thereby rigidly connected to the link 6 in such a manner that the loads applied to the attachment member 14 will be carried principally by the engagement between the attachment member and the pins 13, the spot welds 19 functioning to retain the notches 17 and 18 in load supporting engagement with the pins.

Holes 21 may be formed in the flat body portion 15 of the attachment member 14 for receiving the fastener members by means of which material or object conveying flights may be mounted on the attachment member.

From the above description, it will be readily apparent that attachment members 14 may be mounted on selected links 6 at any desirable point or points along a length of the conventional roller chain 4. The chain 4, therefore, may be assembled by machine into desired lengths and no subsequent disassembly or reassembly of the standard chain links is necessary to convert the chain to an attachment type conveyor chain.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. An attachment link for conveyor chain, comprising a pair of side bars, a pair of chain pins connecting said side bars at opposite end portions of the attachment link and connecting the said link to the adjacent links of a conveyor chain assembly, an attachment member having spaced mounting portions positioned to overlap said side bars, said mounting portions having notches in one pair of corresponding end edges for load bearing engagement with a first one of said pins and notches in the other pair of corresponding edges movable into load bearing engagement with the second of said pins by pivotal movement of said member about said first pin, and means for rigidly connecting said mounting portions to portions of said side bars between said pins to maintain said notches in load bearing engagement with their pins.

2. An attachment link for conveyor chain, comprising a pair of side bars, a pair of chain pins connecting said side bars at opposite end portions of the attachment link and connecting the said link to the adjacent links of a conveyor chain assembly, the opposite end portions of each pin projecting outwardly from said side bars on opposite sides of the link, an attachment member having mounting portions contacting in overlapping relation the laterally outer faces of said side bars, each of said mounting portions having a notch in one edge thereof for load bearing engagement with one projecting portion of a first one of said pins and a notch in a spaced edge portion thereof movable into load bearing engagement with one projecting portion of the second pin by pivotal movement of the member about said first pin, the lengths of said pins being less than the lateral spacing between the outer faces of said mounting portions, and means for rigidly connecting each mounting portion to its adjacent side bar to maintain said notches in load bearing engagement with their pins.

3. An attachment link for conveyor chain, comprising a pair of side bars, a pair of chain pins connecting said side bars at opposite end portions of the attachment link and connecting the said link to the adjacent links of a conveyor chain assembly, an attachment member having a flat body portion extending outwardly from the edges of the side bars and spaced mounting portions positioned to overlap said side bars, said mounting portions having notches in their opposite end edges, the notches at the opposite ends of said mounting portions opening in angular relationship with each other and having a distance therebetween equal to the spacing of said pins to permit the notches in one pair of corresponding end edges of the mounting portions to be moved into load bearing engagement with a first one of said pins and pivoted thereon to position the notches in the other pair of corresponding end edges in load bearing engagement with the second of said pins, said member being supported by the load bearing engagement between said notches and their pins, and means for rigidly connecting said mounting portions to portions of said side bars between said pins to maintain the notches in load bearing engagement with their pins.

4. An attachment link for conveyor chain, comprising a pair of side bars, a pair of chain pins connecting said side bars at opposite end portions of the attachment link and connecting the said link to the adjacent links of a conveyor chain assembly, the opposite end portions of each pin projecting laterally outwardly from said side bars on opposite sides of the link, an attachment member having a flat body portion extending angularly outwardly from the edges of the side bars at a first end portion of the link and spaced parallel webs extending from the sides of said flat body portion to positions overlapping the side bars with the outer surface of each web in a plane laterally outwardly of the ends of said pins at the adjacent side of the link, the portions of said webs overlapping said side bars extending between said pins and having notches in the end edges thereof for load bearing engagement with the pins to support the member on the pins against pivotal movement by pressure applied to said flat body portion, the notches associated with the pin at the second end portion of the link opening in a direction to permit assembly of said member on said pins by pivotal movement about the pin at said first end portion, and means for rigidly connecting said web portions to portions of said side bars between said pins to maintain said notches in load bearing engagement with their pins.

5. An attachment link for conveyor chain, comprising a pair of side bars, a pair of chain pins connecting said side bars at opposite end portions of the attachment link and connecting the said link to the adjacent links of a conveyor chain assembly, the opposite end portions of each pin projecting outwardly from said side bars on opposite sides of the link, and an attachment member having a flat body portion extending angularly outwardly from the edges of the side bars at a first end portion of said link and spaced parallel webs extending from the sides of said flat body portion to positions overlapping the laterally outer faces of the side bars, the portions of said webs overlapping said side bars extending between the projecting end portions of said pins and having notches in the end edges thereof for load bearing engagement with the pins to support the member thereon, the notches associated with the pin at said first end portion of the link opening in a longitudinal direction and the notches at the second end portion of the link being open in a direction to permit pivotal movement of the member, with the longitudinal notches in engagement with their pin, to a position of load bearing engagement between the notches at said second end portion of the link and their pin, said web portions each being welded to a portion of the associated side bar between said pins to maintain said notches in load bearing engagement with their associated pins.

References Cited in the file of this patent

UNITED STATES PATENTS

| | | |
|---|---|---|
| 544,434 | Griffith | Aug. 13, 1895 |
| 1,174,965 | Brown | Mar. 14, 1916 |
| 1,638,267 | Morehead et al. | Aug. 9, 1927 |
| 1,922,374 | Krause | Aug. 15, 1933 |
| 2,287,378 | Hapman | June 23, 1942 |

FOREIGN PATENTS

| | | |
|---|---|---|
| 838,122 | Germany | May 5, 1952 |